TRANSISTORIZED MULTIVIBRATOR CIRCUIT ADAPTED TO OSCILLATE FOR ONLY A PREDETERMINED TIME

Filed July 23, 1959

INVENTOR
PHILIP EMILE, JR.
BY S. J. Rotondi, A. J. Dupont, J. E. McGee & J. P. Edgerton United States Patent Office 3,005,963

Patented Oct. 24, 1961

3,005,963

TRANSISTORIZED MULTIVIBRATOR CIRCUIT ADAPTED TO OSCILLATE FOR ONLY A PREDETERMINED TIME

Philip Emile, Jr., Washington, D.C., assignor to the United States of America as represented by the Secretary of the Army Filed July 23, 1959, Ser. No. 829,160
4 Claims. (Cl. 331—113)
(Granted under Title 35, U.S. Code (1952), sec. 266)

The invention described herein may be manufactured and used by or for the Government for governmental purposes without the payment to me of any royalty thereon.

This invention relates generally to multivibrator circuits, and more particularly to a free-running transistor multivibrator circuit adapted to oscillate for a predetermined time after triggering, so as to generate a predetermined number of pulses in response to each trigger pulse.

In a variety of electronic applications, such as in computer circuitry, it is required that a predetermined number of pulses be generated in response to a trigger pulse. Prior art techniques for generating such pulses have been found to be quite complex, thus making it impossible to achieve the compactness that is so important in computer circuitry.

Accordingly, it is the chief object of this invention to provide simple and compact circuitry for generating a predetermined number of pulses in response to an applied trigger pulse.

Another object of this invention is to provide a free-running multivibrator circuit which will oscillate for a predetermined time after being triggered.

The above objects are achieved in this invention by making use of the transistor characteristic that a certain amount of charge is required to turn off a saturated transistor. A transistor free-running multivibrator type of circuit is then designed so that this "charge loss" effect is accentuated to an extent which causes the transistor multivibrator to oscillate for only a predetermined amount of time, thereby generating a predetermined number of pulses in response to the receipt of each trigger pulse.

The specific nature of the invention, as well as other objects, uses and advantages thereof, will clearly appear from the following description and from the accompanying drawing, in which.

Figure 1:
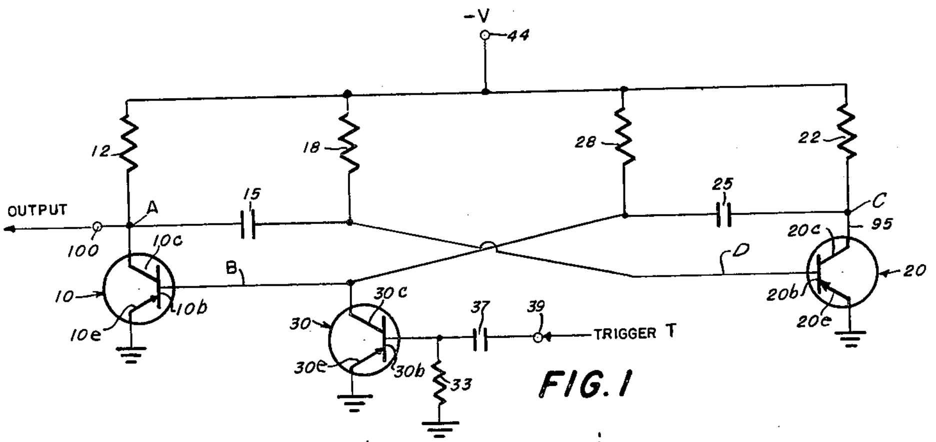
FIG. 1 is a circuit diagram of a free-running transistor multivibrator circuit in accordance with the invention.
Figure 2:
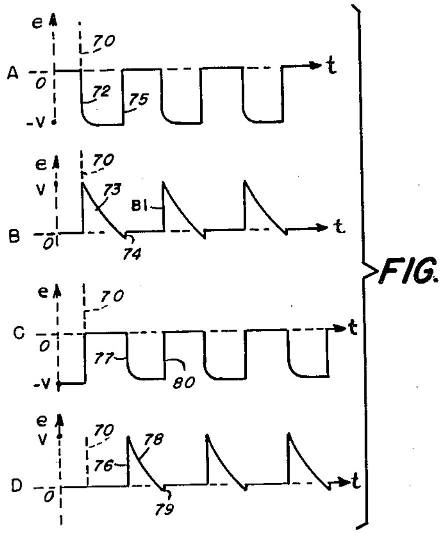

FIG. 2, graphs A, B, C, and D, illustrates the waveforms obtained at the corresponding points A, B, C and D in FIG. 1 when the circuit of FIG. 1 is designed to operate as a conventional free-running multivibrator.

Figure 3:
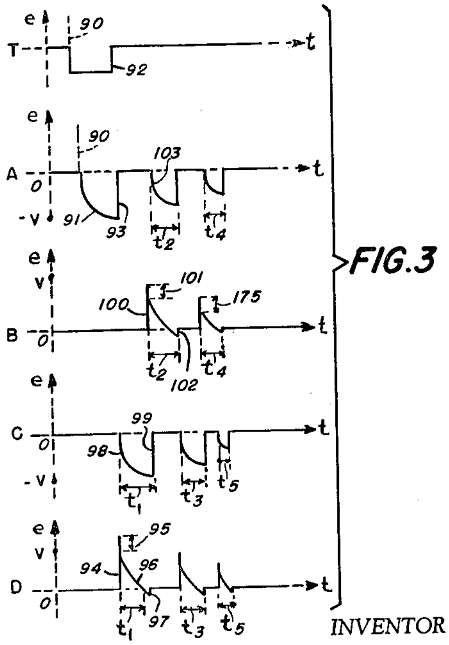

FIG. 3, graphs A, B, C, D and T, illustrate the waveforms obtained at the corresponding points A, B, C, D and T in FIG. 1 when the circuit of FIG. 1 is designed in accordance with the present invention.

In FIG. 1, two transistors 10 and 20 are connected in a manner similar to that of a conventional type of free-running multivibrator circuit. The transistor 30 and its associated circutry 33, 37 and 39 are employed to provide triggering when the circuit of FIG. 1 is designed in accordance with the invention. For the purposes of the illustrative embodiment of the drawing it will be assumed that the transistors 10, 20 and 30 are of the PNP type, but it is to be understood that NPN transistors may also be used with appropriate changes in the polarity of applied voltages.

The transistor 10 has a collector resistor 12 connected between the collector 10*c* and a source of collector voltage —V applied to the terminal 44; a resistor 28 serves as a base resistor for the transistor 10 and is connected between the voltage source —V and the base 10*b*; and the emitter 10*e* of the transistor 10 is connected to circuit ground. Likewise, in regard to the transistor 20, a collector resistor 22 is connected between the collector 20*c* and the voltage source —V; a base resistor 18 is connected between the base 20*b* and the voltage source —V; and the emitter 20*e* is connected to circuit ground. A first coupling capacitor 15 is connected between the collector 10*c* of the transistor 10 and the base 20*b* of the transistor 20, while a second coupling capacitor 25 is connected between the collector 20*c* of the transistor 20 and the base 10*b* of the transistor 10, in accordance with well known free-running multivibrator circuitry. Also in accordance with conventional free-running multivibrator circuitry, the collector resistors 12 and 22 and the base resistors 18 and 28 are chosen so that in the absence of the coupling capacitors 15 and 25, the transistors 10 and 20 will be in a state of saturation.

The transistor 30 and associated circuitry are employed in the present invention to provide triggering. The collector 30*c* of the transistor 30 is connected to the base 10*b* of the transistor 10, the emitter 30*e* is connected to circuit ground, and the base 30*b* is adapted to receive a trigger pulse which will cause the transistor 30 to become saturated. The resistor 33 connected between the base 30*b* and circuit ground serves as an input resistor, while the capacitor 37 serves as an input capacitor for the trigger pulse applied at the terminal 39.

Except for the transistor 30 and its associated circuitry, the circuit of FIG. 1 is similar to that of a free-running transistor multivibrator. In order to explain the operation of this invention and better point out its inventive features, the circuit of FIG. 1 (assuming that the transistor 30 and its associated circuitry are absent) will be described as if it were designed as a conventional type of free-running multivibrator.

As is well known, conventional free-running multivibrator operation is obtained by designing the circuit so that the charging and discharging of the capacitors 15 and 25 act to alternately cut off and saturate the transistors 10 and 20, thereby producing continuous oscillations. For the purposes of this specification and the appended claims, the charged condition of capacitors 15 or 25 will be referred to as the condition when the respective capacitor 15 or 25 is charged up to the voltage —V through its respective collector resistor 12 or 22. For this condition the collector side of the capacitor 15 or 25 is at a voltage —V with respect to the base side of the capacitor 15 or 25. It will be understood, therefore, that when the transistor 20 is saturated and the transistor 10 is cut off, the capacitor 15 charges up to the voltage —V through the collector resistor 12 and the effective short between the base 20*b* and the grounded emitter 20*e* of the saturated transistor 20; but when the transistor 20 is cut off and the transistor 10 is saturated, the capacitor 15 discharges through the base resistor 18 and the effective short between the collector 10*c* and the grounded emitter 10*e* of the saturated transistor 10, heading towards a voltage of —V in the opposite direction. Likewise, when the transistor 10 is saturated and the transistor 20 is cut off, the capacitor 25 charges up to the voltage —V through the collector resistor 22 and the effective short between the base 10*b* and the ground emitter 20*e* of the saturated transistor 20; but when the transistor 10 is cut off and the transistor 20 is saturated, the capacitor 25 discharges through the base resistor 28 and the effective short between the collector 20*c* and the grounded emitter 20*b* of the saturated transistor 20, heading towards a voltage of —V in the opposite direction.

From these basic considerations the operation of the circuit of FIG. 1 as a free-running multivibrator may now be explained using the graphs A, B, C, and D of FIG. 2 which correspond to the points A, B, C and D indicated in FIG. 1. For this purpose it will be assumed that there is initially an open switch in the lead 95 of the collector 20*c* of the transistor 20. With this assumed switch initially open, the transistor 10 will be saturated so that the capacitor 25 will be charged up to the voltage —V through the collector resistor 22 as shown at B and C in FIG. 2. The capacitor 15, on the other hand, will have substantially no voltage cross it, both sides being at substantially zero volts, because the collector 10*c* of the saturated transistor 10 and the base 20*b* of the transistor 20 are effectively at circuit ground as shown at A and D in FIG. 2. If the assumed switch in lead 95 is now closed as indicated at 70 in FIG. 2, the voltage —V across the capacitor 25 is effectively applied between the base 10*b* and the emitter 10*e* of the transistor 10 in a direction so that the base 10*b* is driven highly positive to the voltage V as shown by B in FIG. 2, thereby turning off the transistor 10. With the transistor 10 cut off, the capacitor 15 rapidly charges to the voltage —V through the collector resistor 12 and the effective short between the base 20*b* and the emitter 20*e* of the saturated transistor 20 as shown at 72 of FIG. 2, A. The voltage on the capacitor 25 which is holding the transistor 10 cut off discharges through the base resistor 28 and the effective short between the collector 20*c* and the grounded emitter 20*e* as shown by 73 of FIG. 2, B. When the voltage applied to the base 10*b* becomes slightly negative as shown by 74 in FIG. 2. B, the transistor 10 is turned on and becomes saturated, causing its collector voltage to immediately change to substantially zero volts, as shown by 75 in FIG. 2, A. The voltage —V to which the capacitor 15 has been charged is thus applied to the base 20*b* of the transistor 20 as the positive voltage V so as to cut off the transistor 20, as shown by 76 in FIG. 2, D. The capacitor 25 now rapidly charges up to the voltage —V through the collector resistor 22 and the effective short between the base 10*b* and the emitter 10*e* of the saturated transistor 10 as shown by 77 in FIG. 2, C. The voltage on the capacitor 15 which is holding the transistor 20 cut off discharges through the base resistor 18 and the effective short between the collector 10*c* and the grounded emitter 10*e* as shown by 78 in FIG. 2, D. When the voltage applied to the base 20*b* becomes slightly negative as shown by 79 in FIG. 2, D, the transistor 20 is turned on and becomes saturated, causing its collector voltage to immediately drop to substantially zero volts as shown by 80 in FIG. 2, C. The voltage —V to which the capacitor 25 has been charged is once again applied to the base 10*b* of the saturated transistor 10 cutting it off as shown at 81 in FIG. 2, B and the above-described operation then repeats periodically to produce conventional free-running multivibrator oscillations as shown in FIG. 2.

It should be noted in connection with the above description that the design of a free-running multivibrator requires that the charging time of the capacitors 15 and 25 through their respective collector resistors 12 and 22 be very much shorter than the discharge time of these capacitors through their respective base resistors 18 and 28. This ensures that oscillations will not gradually die out.

The circuit of FIG. 1 need not be designed as a free-running multivibrator circuit as just described, but in accordance with this invention may be designed to provide multivibrator oscillations which will last for only a predetermined time after being triggered, so that a predetermined number of pulses will be generated in response to the receipt of each trigger pulse. Such a design is made possible first, by choosing the values of the capacitors 15 and 25 to take advantage of the "lost charge" effect whereby a certain amount of charge is required to change the transistor from its saturated condition to its cut off condition; and second, by making the time required to charge the capacitors 15 and 25 through their respective resistors 12 and 22 only slightly less than the time required for these capacitors 15 and 25 to discharge through their respective base resistors 18 and 28 to the slightly negative value which causes the respective transistor to be turned on. Advantage is taken of the "lost charge" effect by choosing the magnitude of the capacitors 15 and 25 from which the charge which is required to cut off the transistors is obtained, so that the removal thereof cause a significant drop in the voltage on these capacitors, thereby reducing the discharge time which is required for the voltage to drop to the slightly negative value which turns the transistor on again. By such a design, the reduction in discharge time can be made cumulative so that the multivibrator oscillates for shorter periods until finally it cuts off sharply until triggered again. With the above in mind, the operation of the circuit of FIG. 1 designed in accordance with the invention will now be described.

The transistor 30 is adapted to become saturated when a suitable positive trigger pulse is applied to the terminal 39 such as illustrated at FIG. 3, T. Prior to receipt of this trigger pulse, the transistors 10 and 20 will initially both be saturated as shown by FIG. 3, graphs A, B, C, D and T which correspond to the same points indicated in FIG. 1. Thus, both collectors 10*c* and 20*c* and both bases 10*b* and 20*b* will be effectively at circuit ground.

When the transistor 30 is driven to saturation by the application of a suitable trigger pulse as shown in FIG. 3, T to the terminal 39, the base current which is being applied to the base 10*b* of the transistor 10 to cause saturation thereof is diverted through the collector 30*c* and the emitter 30*e* of the transistor 30 to circuit ground, thus cutting off the transistor 10. The time of application of the trigger pulse is illustrated by 90 FIG. 3, T and A. With the transistor 10 cut off and the transistor 20 saturated, the coupling capacitor 15 will then charge through the collector resistor 12 and the effective short between the base 20*b* and the emitter 20*e* of the saturated transistor 20 to the voltage —V, as illustrated by 91 in FIG. 3, A. It can be seen that this rise in voltage 91 is much slower than that in FIG. 2, A for the conventional free-running multivibrator. The trigger pulse is preferably chosen to have a width such that the capacitor 15 charges up fully to the voltage —V. When the trigger pulse is removed, as shown at 92 in FIG. 3, T, the transistor 10 goes back into a saturated condition so that its collector voltage immediately drops to essentially zero volts, as shown by 93 in FIG. 3, A. The voltage —V to which the capacitor 15 has been charged is thus applied to the base 20*b* of the transistor 20 as the positive voltage V so as to cut off transistor 20, as shown by 94 in FIG. 3, D. Since a finite amount of charge is required to cut off the transistor 20, a finite amount of charge is removed from the capacitor 15 in cutting off the transistor 20 when the trigger pulse is removed. The capacitor 15 is chosen to have a value so that the loss of this charge in cuting off the transistor 20, causes a significant drop in voltage on the capacitor 15, as indicated by 95 in FIG. 3, D.

The time required for the capacitor 15 to discharge through the base resistor 18, as indicated by 96 in FIG. 3, D, to the slightly negative voltage which turns on the transistor 20, indicated by 97 in FIG. 3, D, will thus be reduced as a result of this "charge loss" effect, which reduced the initial voltage on the capacitor 15. During the time that the capacitor 15 is discharging as indicated by 96 in FIG. 3, D, the capacitor 25 charges through the collector resistor 22, as shown by 98, FIG. 3, D. Because the charging time of the capacitor 25 is dependent upon the time $t_1$ required for the capacitor 15 to discharge to the slightly negative voltage which turns on the transistor 20 (97 in FIG. 3, D), the reduction in this discharge time by the "charge loss" effect prevents the capacitor 25 from fully charging to the voltage —V. Thus, the cut-off voltage applied to the base 10*b* of the transistor 10 when the collector 20*b* of the transistor 20 falls to essentially zero volts (99 in FIG. 3, C), will be significantly less than the voltage V, as shown by 100 in FIG. 3, B.

The finite amount of charge required to cut off the transistor 10 now causes a significant drop in voltage on the capacitor 25, which like the capacitor 15 is chosen to accentuate this effect, as shown by 101 in FIG. 3, B. It will be seen, therefore, that the time $t_2$ required for the capacitor 25 to discharge to the slightly negative voltage which turns the transistor 10 on again (102 in FIG. 3, B) will be shorter than the time $t_2$, so that the capacitor 15 can only charge to a voltage which is considerably less than —V, as shown by 103 in FIG. 3, A, and correspondingly smaller than the voltage to which the capacitor 25 was charged as shown by 98 in FIG. 3, C.

It will now be evident that the action of the circuit of FIG. 1 designed in accordance with the invention will be cumulative, with the cycling time getting shorter and shorter, as shown by $t_3$, $t_4$ and $t_5$ in FIG. 3. When the capacitor 15 or 25 is charged to a small enough voltage so that the voltage or charge on the capacitor (whichever occurs sooner) is insufficient to turn the particular transistor off, the oscillations will cease and both transistors 10 and 20 will remain in a saturated condition until the receipt of another trigger pulse. In the illustrative graphs A, B, C and D of FIG. 3, it can be seen that three pulses are obtained at the output terminal 100 connected to the collector 10*c* before oscillations cease. It is to be understood, however, that in accordance with the invention the circuit may be designed so that any number of pulses may be generated up to as many as 50 or 100, or even more before oscillations cease. This may be accomplished by proper choice of the coupling capacitors 15 and 25 and the charging and discharging times thereof as will be evident to those skilled in the art from the above description.

In order to facilitate the design of a circuit in accordance with the invention, the following information will be presented, but such information is presented only by way of illustration and is in no way intended to limit the scope of the invention. It has been found that if the collector resistors 12 and 22, the base resistors 18 and 28, and the coupling capacitors 15 and 25 are respectively made equal, the ratio of the base resistor 18 or 28 to the collector resistor 12 or 22 is chosen to be between 1 and 5, and the ratio of the charge Q required to turn the transistor off to the supply voltage V and the value of the coupling capacitor C is chosen such that:

$$\frac{Q}{VC} \geq 0.3$$

then the cyclic operation of the circuit of FIG. 1 will be cumulative so that oscillations will cease after a predetermined time. The amount of charge Q require to turn off a transistor is fairly constant for the same transistor and does not differ very much for similar types of transitsors. The value of this charge Q may be determined either by mathematical calculations from the published data on the transistor or by simple experimental tests. It should be appreciated, however, that the smaller the coupling capacitors 15 and 25 are chosen, the shorter the time that oscillations will take place because the "charge loss" effect will then be more accentuated. It is also to be understood that the charging and discharging times of the capacitors 15 and 25 must be chosen in conjunction with the amount of voltage lost on the capacitors 15 and 25 due to the "charge loss" effect and the initial voltage to which these capacitors are charged, so that the cycling time will be progressively reduced.

It can be seen from the above described operation of the circuit of FIG. 1 designed in accordance with the present invention, that a predetermined number of pulses can be obtained in response to each applied trigger pulse. It has been found that for a given transistor used in such a circuit, the accuracy of the number of predetermined pulses obtained can be made very stable for pulses less than 25, and extremely stable for pulses less than 10. A circuit with these properties, therefore, is very desirable for use in computers where pulse multiplication is desired. Because the circuit of this invention, as exemplified in FIG. 1, can be made in compact form, it is expected to find advantageous use in computer circuitry where simplicity and compactness is of great importance.

Figure 1A:
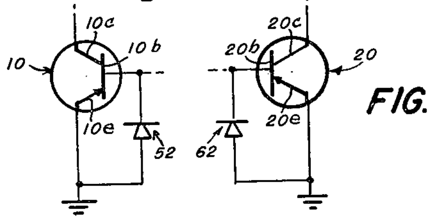
FIG. 1A is a circuit diagram of a portion of FIG. 1 showing a modified embodiment in accordance with the invention.

In a specific circuit in accordance with the invention as shown in FIG. 1A, the base resistors 18 and 28 are chosen equal to 51,000 ohms, the collector resistors 12 and 22 are chosen equal to 12,000 ohms, the coupling capacitors 15 and 25 are chosen equal to 1,000 micromicrofarads, the transistors 10, 20, and 30 are all of the 2N207 type, the diodes 52 and 62 are of the IN34 type, and the collector voltage supply —V is chosen equal to 10 volts. For this specific circuit, 17 pulses consistently obtained in response to each trigger pulse with a total oscillation time of the order of 500 microseconds. These 17 pulses are reliably obtained even though the voltage —V is varied from 5 to 15 volts.

Another use for the circuit of FIG. 1 designed in accordance with the invention is for producing oscillations which last for only a predetermined period where this is the desired feature rather than a predetermined number of pulses. It has been found that by making the cummulative action less pronounced, oscillations in response to a trigger pulse may be caused to last for as long a time as 5 to 10 minutes. Such operation is useful in the use of electronic timing circuits where long time responses are desired, and this circuit makes it possible to obtain this type of function in compact form without the need for time delay relays or complicated gas discharge tube circuits.

It should be noted at this time that even if the "charge loss" effect were absent or were not taken advantage of by making the coupling capacitors 15 and 25 small enough, intermittent free-running multivibrator operation can be obtained by making the time required to charge the coupling capacitor longer than the time required for the coupling capacitor to discharge to the slightly negative voltage which turns the transistor on. It will be understood that for such a condition, the magnitude of the oscillations and the cycling time will gradually decrease at an exponential rate until the voltage to which one of the coupling capacitors is charged is insufficient to cut off the transistor. Because the "charge loss" effect is not present, the time after triggering at which oscillations cease will be highly unpredictable, and in addition will be dependent upon a critical supply voltage —V and carefully chosen components. The predetermined number of pulses generated, therefore, will be highly unpredicatable. Such intermittent free-running multivibrator operation is practically useless in the above-mentioned applications.

By taking advantage of the "charge loss" effect as in the present invention, however, it will be seen from FIG. 3, that the significant drop in capacitor voltage caused by this effect produces free-running multivibrator oscillations which cut off sharply rather than exponentially. This makes it possible to design the circuit to be independent of the voltage —V and the components over a wide range of variations. A circuit, in accordance with this invention, therefore, is able to reliably and accurately generate a predetermined number of pulses or provide oscillations for a predetermined time, thereby making the circuit highly desirable as a compact and simple unit for computer or timing applications.

In connection with this invention it is to be understood that the "charge loss" effect described may be accentuated by appropriately incorporating in the circuit semiconductor diodes, many of which have also been found to exhibit this effect. In FIG. 1A, which shows a portion of FIG. 1 with a preferred form of such a modification, two semiconductor diodes 52 and 62 are connected in parallel with the bases 106 and 206 of the transistors 10 and 20, with their plates grounded. During circuit operation a finite amount of charge will now be required to turn off the diode in addition to the charge required to turn off the transistor. It can be seen, therefore, that by use of such diodes multivibrator circuits having other amplifying means than transistors, such as electron tubes, which do not exhibit this "charge loss" effect, may also be made to provide intermittent free-running multivibrator operation in accordance with the invention.

It will thus be apparent that the illustrative embodiment described is only exemplary and that various modifications can be made in construction and arrangement within the scope of the invention as defined in the appended claims.

I claim as my invention:

1. A multivibrator circuit adapted to oscillate for a predetermined number of cycles in response to an applied trigger pulse, said circuit comprising in combination: first and second transistors, first and second coupling capacitors, resistance means and voltage supply means all connected for free-running multivibrator operation, both said transistors being initially in the saturated condition, means for applying a triggering pulse to cut off one of said transistors, said transistors exhibiting the characteristic that a finite charge is required to change each transistor from its saturated to its cut off condition, and means including the values of said resistance means and said capacitors for successively reducing the amount of charge on said capacitors during each of said cycles of operation.

2. A free-running multivibrator circuit adapted to generate a predetermined number of pulses in response to an applied trigger pulse, said circuit comprising in combination: first and second transistors, each having a collector, a base and a grounded emitter, a collector power supply, first and second equal collector resistors, said first collector resistor being connected between said power supply and the collector of said first transistor, said second collector resistor being connected between said power supply and the collector of said second transistor, first and second substantially equal base resistors, said first base resistor being connected between said power supply and the base of said first transistor, said second base resistor being connected between said power supply and the base of said second transistor, first and second substantially equal coupling capacitors, said first coupling capacitor being connected between the collector of said first transistor and the base of said second transistor, said second coupling capacitor being connected between the collector of said second transistor and the base of said first transistor, said base and collector resistors being chosen to have values such that both said first and second transistors would be saturated in the event said coupling capacitors were absent, a third transistor having a collector, a base and a grounded emitter, the collector of said third transistor being connected to the base of one of said first and second transistors, and means for applying a triggering pulse to the base of said third transistor to cause saturation thereof, the ratio of one of said base resistors to one of said collector resistors being chosen substantially between 1 and 5, said first and second transistors exhibiting the characteristic that a finite charge Q applied to the transistor base is required to change each of said first and second transistors from its saturated to its cut off condition, the ratio of the charge Q to the supply voltage V and the value C of each of said coupling capacitors being substantially chosen such that $$\frac{Q}{VC} \geq 0.3$$

3. The invention in accordance with claim 2, there being additionally provided: first and second semiconductor diodes each of which exhibit the characteristic that a finite amount of charge is required to cut off the diode, said first diode being connected between the base of said first transistor and circuit ground, said second diode being connected between the base of said second transistor and circuit ground, said diodes being poled in the same direction as the diode formed by the base and emitter of said first and second transistor.

4. A multivibrator circuit adapted to oscillate for a predetermined number of cycles in response to an applied trigger pulse, said circuit comprising in combination: first and second amplifying means each having at least three elements one of which is a control element, first and second coupling capacitors, resistance means and voltage supply means all connected for free-running multivibrator operation, means for applying a triggering pulse to cut off one of said amplifying elements, both of said amplifying elements being initially in the conductive state, and first and second semiconductor diodes each connected between a control element and one of the other elements of an amplifying means and poled in the same direction as the diode formed thereby, each of said diodes exhibiting the characteristic that a finite amount of charge is required to cut off the diode, and means including the values of said resistance means and said capacitors for successively reducing the amount of charge on said capacitors during each of said cycles of operation.

References Cited in the file of this patent

UNITED STATES PATENTS

| | | |
|---|---|---|
| 2,873,372 | Chase | Feb. 10, 1959 |
| 2,900,606 | Faulkner | Aug. 18, 1959 |